Jan. 2, 1940. A. S. VAN HALTEREN 2,185,875
BRAKE DRUM
Original Filed July 25, 1935
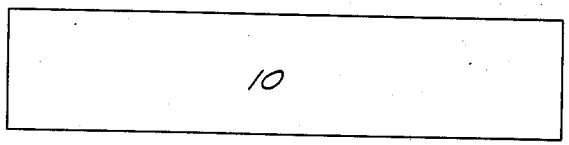
FIG. 1
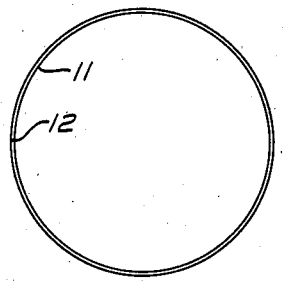
FIG. 2
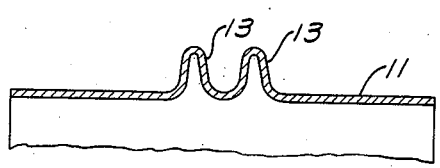
FIG. 3
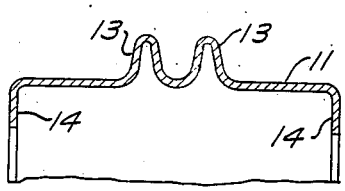
FIG. 4
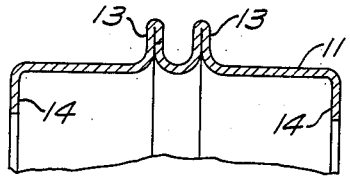
FIG. 6
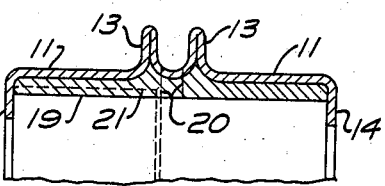
FIG. 5
FIG. 7
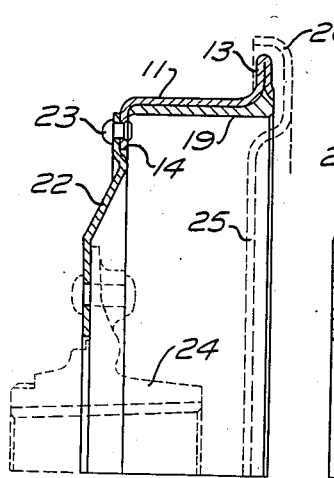
FIG. 8
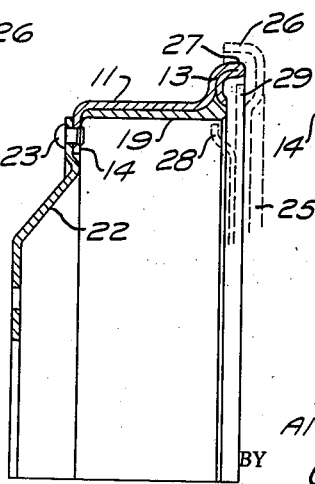
FIG. 9
INVENTOR.
ANDREW S. VANHALTEREN
BY Carroll R. Taber
ATTORNEY.

Patented Jan. 2, 1940

2,185,875

UNITED STATES PATENT OFFICE 2,185,875

BRAKE DRUM

Andrew S. Van Halteren, Lansing, Mich., assignor to Motor Wheel Corporation, Lansing, Mich., a corporation of Michigan Original application July 25, 1935, Serial No. 33,081, now Patent No. 2,112,697, dated March 29, 1938. Divided and this application November 18, 1937, Serial No. 175,212

4 Claims. (Cl. 188—218)

This invention relates to brake drums. Specifically, the invention relates to brake drums comprising a steel shell having an inner liner fused thereto and extending part way only into a hollow external rib at one edge of the shell whereby the outer portion of the rib may be flanged to form a seal.

The brake drum herein disclosed is preferably made by the process described in my prior co-pending application Serial No. 33,081, filed July 25, 1935, of which this application is a division. It will be understood, however, that it may be made by other methods.

The principal object of the invention is the provision of a drum which has all of the strength and wear resisting characteristics of the cast lined drums now in use but which is lighter, more economical to produce, and which may be deformed to provide an integral axially extending sealing flange at the open edge of the drum. The manner of attaining these and other objects will be apparent upon reading the following description in connection with the accompanying drawing, wherein:

Figure 1 illustrates a flat strip of steel used in forming the shell for two drums;

Figure 2 shows the strip of Figure 1 coiled to cylindrical form;

Figure 3 shows the cylinder after the formation of a pair of external ribs intermediate its edges;

Figure 4 shows the cylinder after its edges have been turned inwardly to provide attaching flanges;

Figure 5 illustrates the manner in which the side walls of the external ribs are pressed together;

Figure 6 shows the cylinder after the operation illustrated in Figure 5;

Figure 7 shows the cylinder after the cast liner has been fused thereto and indicates by dotted lines where the shell and liner are cut to produce a pair of cast lined rings;

Figure 8 shows the cast lined ring attached to a brake drum web, and assembled with its associated parts, the latter being shown in dotted lines; and Figure 9 shows the cast lined ring and web assembled with a modified form of backing plate (dotted lines) with the radial rib of the ring shell bent to form an axially extending seal flange.

In forming the present invention a strip of sheet steel 10, as shown in Figure 1, is selected of the desired length and width. It is then coiled as indicated in Figure 2 to provide a cylindrical shell 11. The ends of the strip are welded together as indicated at 12 in Figure 2.

The cylinder 11 is next submitted to conventional rolling operations whereby the two external ribs 13 are formed intermediate the edges of the shell (see Figure 3). The ribs 13 are quite close to each other and extend completely around the shell 11.

The cylinder 11 is next operated upon to provide the inturned flanges 14 at its opposite edges. This operation may be performed by any conventional method. The flanges serve as side boards to retain the molten cast iron which is subsequently introduced into the shell and also as attaching flanges in the finished brake drum.

It is desired to prevent the molten cast iron from filling the ribs 13 as has been the practice heretofore in order to minimize the quantity of iron required and also to permit the bending of the ribs to form seal flanges. To this end, the cylinder is next treated as illustrated in Figure 5 to close the outer portion of the ribs. As there shown the cylinder is mounted on a platform 15 with an annular spacer 16 between the ribs 13. A movable die 17 is arranged to press against the outer wall of the adjacent rib 13. The platform 15 is hollow to receive the cylindrical portion of the shell 11. The die 17 is likewise hollow for a similar purpose. The spacer 16 is preferably made up of two or more sections which are inserted between the ribs 13 before the shell 11 is mounted on platform 15. The radially outer surface of spacer 16 is inclined to contact the inclined side wall 18 of platform 15 whereby the metal between ribs 13 is pressed inwardly during the closing of the ribs. Platform 15 is stationary and die 17 is reciprocated vertically in and out of contact with the shell 11 by any conventional means.

As shown in Figure 6, the operation just described closes the radially outer portion of each of the ribs 13 but leaves a hollow portion or annular groove at the base of the rib. Consequently when the cast iron liner is applied to the shell by rotating the same while pouring molten iron into it, the molten iron flows into the base only of the ribs 13. Figure 7 shows the shell after the cast iron has been introduced as just described. The cast liner is indicated at 19. During the introduction and solidifying of the cast iron the flanges 14 serve to hold the molten metal in the rotating shell. The method of attaching a cast liner in this manner is now in use and is well known.

After the cast iron liner 19 has been fused to the shell 11 and has solidified, an annular section of the shell and liner located between the ribs 13 is removed by cutting the same along dotted lines 20 (Figure 7). In this manner two identical cast lined brake rings are produced, each having an attaching flange 14 at one edge and an external rib 13 at the other edge. To prepare the ring thus formed they are next machined to proper size as shown by the dotted lines 21 in Figure 7. They may also be sized by a conventional sizing operation, if desired.

After the machining and sizing operations the cast lined rings are ready for assembly in a brake drum. As shown in Figure 8 the cast lined ring is attached to a brake drum web 22 by rivets 23. The web is mounted upon a hub 24 shown in dotted lines. A backing plate 25, also shown in dotted lines, is mounted adjacent the open side of the drum in the usual manner. The backing plate 25 is here shown as having a peripheral flange 26 cooperating with rib 13 to effect a seal for the brake drum to prevent the entrance of foreign matter into the drum.

Figure 9 illustrates a modified arrangement of the drum assembly. In this instance, the ring is also attached to a web 22, but the radial outer portion of the rib 13 is bent axially to form a seal flange 27. This is made possible only by reason of the fact that the cast liner does not extend into this outer portion of the rib. In this form of arrangement the backing plate 25 is preferably provided with seal rings 28 and 29 in addition to the peripheral flange 26. In this manner a more effective seal is formed.

From the foregoing description it will be apparent that this invention provides an improved form of cast lined brake drum. Obviously the form of the drum may be varied within wide limits without departure from the spirit or scope of the invention as defined by the appended claims.

I claim:

1. A brake drum comprising a cylindrical shell having an external rib hollow at its base and closed at its radially outer extremity, and a metal liner secured to the inner surface of the shell and extending into the base of the rib, the radially outer extremity of the rib being flanged to form an axially extending sealing element.

2. A brake drum comprising a steel shell having an external rib at one edge thereof, and a cast metal liner fused to the inner surface of the shell and the base of the rib, the radially outer portion of the rib being flanged to form an axially extending seal.

3. A brake drum comprising a cylindrical steel shell having an external annular rib at one edge thereof, said rib being of double thickness with the walls thereof pressed together, and a cast metal liner fused to the inner surface of the shell and the base only of said rib, the radially outer portion of said rib being bent axially to form an axially extending sealing flange.

4. A brake drum comprising a cylindrical steel shell having an external annular rib pressed outwardly therefrom with the walls of said rib pressed together, and a cast metal liner fused to the inner surface of the shell and the base only of said rib, the radially outer portion of said rib being bent axially to form an axially extending sealing flange.

ANDREW S. VAN HALTEREN.